Dec. 22, 1964

S. G. BELEZOS 3,162,061

ADAPTER FOR MOUNTING A SPEED-REDUCER

Filed March 1, 1962

INVENTOR.
Stratis George Belezos
BY
Roberts Cushman & Grover
ATT'YS

Dec. 22, 1964  S. G. BELEZOS  3,162,061
ADAPTER FOR MOUNTING A SPEED-REDUCER
Filed March 1, 1962  4 Sheets-Sheet 4
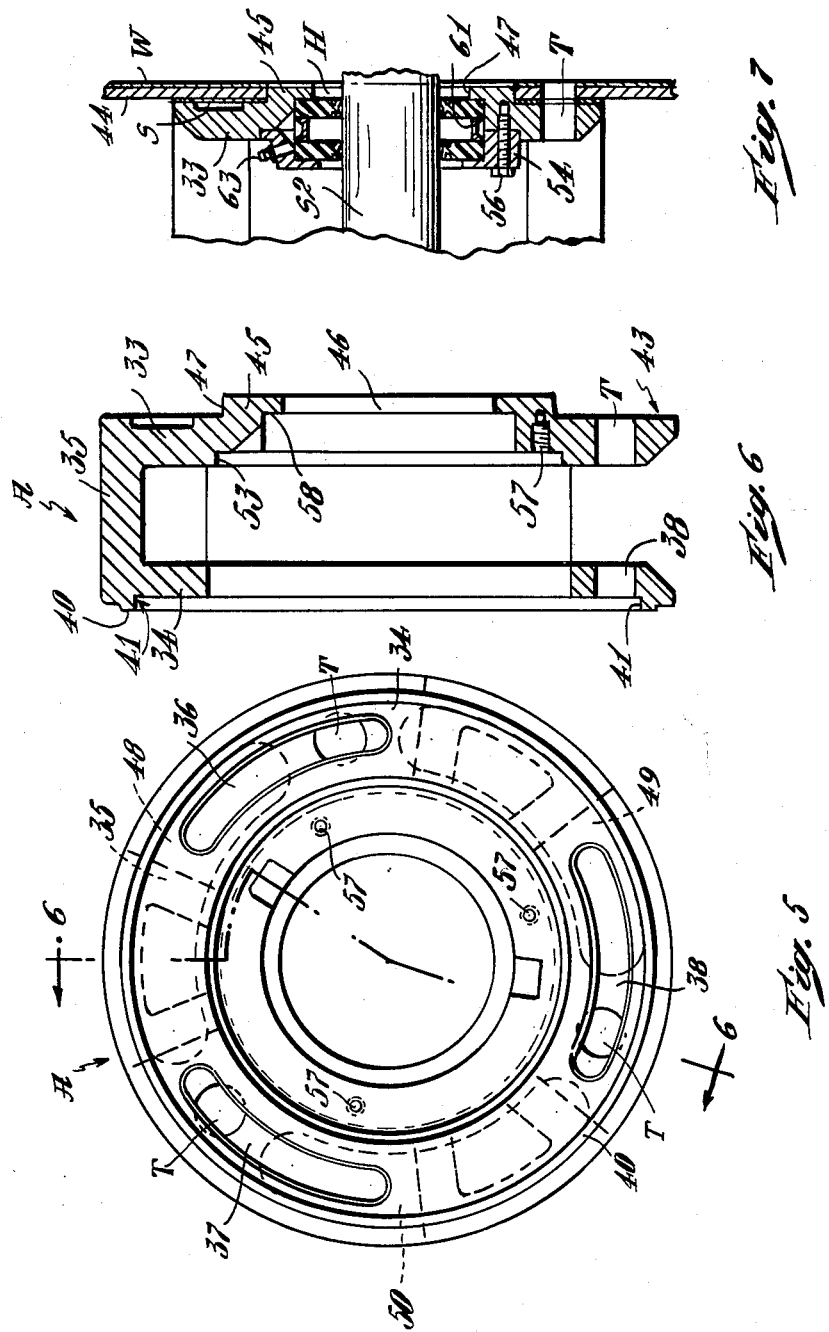

United States Patent Office
3,162,061
Patented Dec. 22, 1964

3,162,061
ADAPTER FOR MOUNTING A SPEED-REDUCER
Stratis G. Belezos, Canton, Mass., assignor to The Murray Company of Texas, Inc., Dallas, Tex., a corporation of Delaware
Filed Mar. 1, 1962, Ser. No. 176,691
4 Claims. (Cl. 74—606)

This invention pertains to speed-reducing mechanism, more especially to an adapter for mounting a speed-reducer upon the frame or casing of a machine which is to be driven. More especially, the invention concerns a supporting bracket or "adapter" for use with a speed-reducer of the kind wherein an output shaft, turning in bearings in a hollow casing, is driven by an input shaft, whose axis is parallel to that of the output shaft, through the intermediary of gearing within the casing, and wherein the adapter and the casing of the speed-reducer have normally interengaging parts designed to permit rotation of the speed-reducer casing as a unit about the axis of its output shaft relatively to the adapter, whereby the position of the input shaft of the speed-reducer may be changed, for example, to adjust the tension of a drive belt.

Among the objects of the invention are to provide an adapter so designed that rotary adjustment of the speed-reducer casing relatively to the adapter may be accomplished without disturbing the attachment of the adapter to the machine frame or casing upon which it is mounted. A further object is to provide an adapter so devised that, when it is once attached and sealed to the machine, it is unnecessary to break the seal in order either to rotate the speed-reducer casing or to remove the speed-reducer casing from the adapter. A further object is to provide an adapter comprising means whereby the speed-reducer may be attached thereto in such a manner as to insure positive axial alignment of the interengaging parts of the speed-reducer unit and the adapter when the speed-reducing unit is replaced after removal from the adapter. A further object is to provide an adapter and speed-reducer unit having interengaging parts of such a design as to permit speed-reducers of different sizes, but having mounting connections of the same dimensions, to be attached to the same adapter. A further object is to provide an adapter and speed-reducer wherein the output shaft of the speed-reducer is provided with a built-in oil seal thereby avoiding loss of oil from the speed-reducer casing during removal or replacement of the speed-reducer. A further object is to provide a combination of adapter and speed-reducer wherein oil seals are provided at two spaced locations, axially of the output shaft of the speed-reducer, one operative to retain gear lubricant within the reducer casing and the second to prevent leakage of fluid from the driven machine, along the output shaft of the speed-reducer.

Other and further objects and advantages of the invention will be pointed out in the following more detailed description and be reference to the accompanying drawings wherein:

FIG. 5 is an elevation showing that face of the adapter which is connected to the speed-reducer, but omitting the latter;

FIG. 6 is a section on the line 6—6 of FIG. 5;

FIG. 7 is a fragmentary section in the vertical plane of the axis of the speed-reducer output shaft, showing that end portion of the adapter which is applied to the casing of the machine to be driven;

Figure 1:
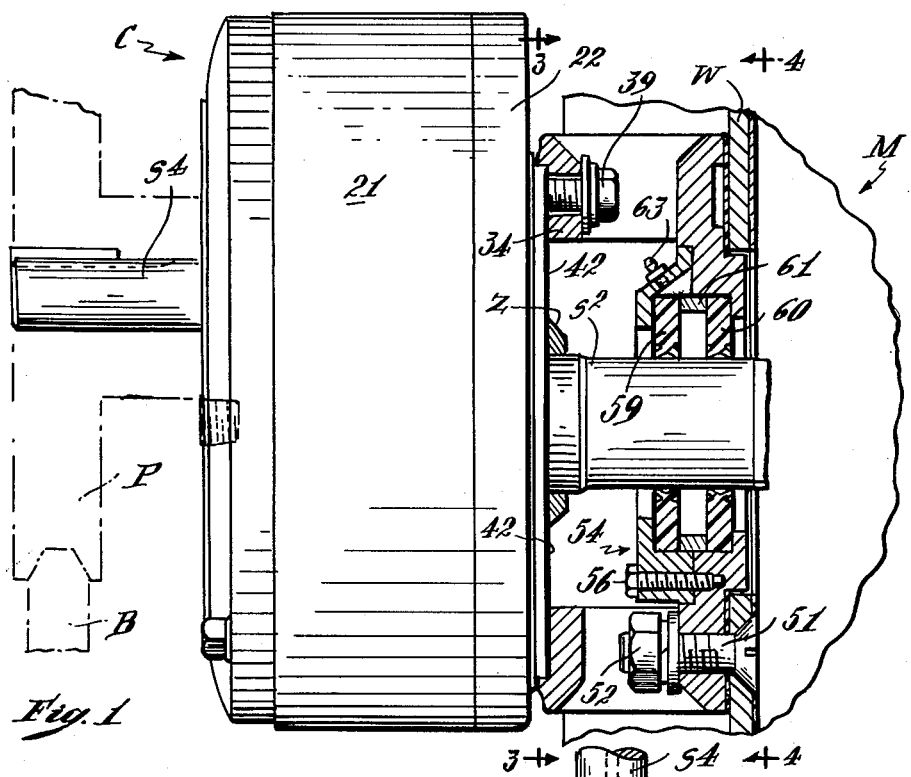
FIG. 1 is a fragmentary side elevation, partly in vertical section, showing the adapter and speed-reducer of the present invention operatively mounted upon the casing of a machine and indicating, in broken lines, the drive pulley and belt whereby the input shaft of the speed-reducer is driven.
Figure 2:
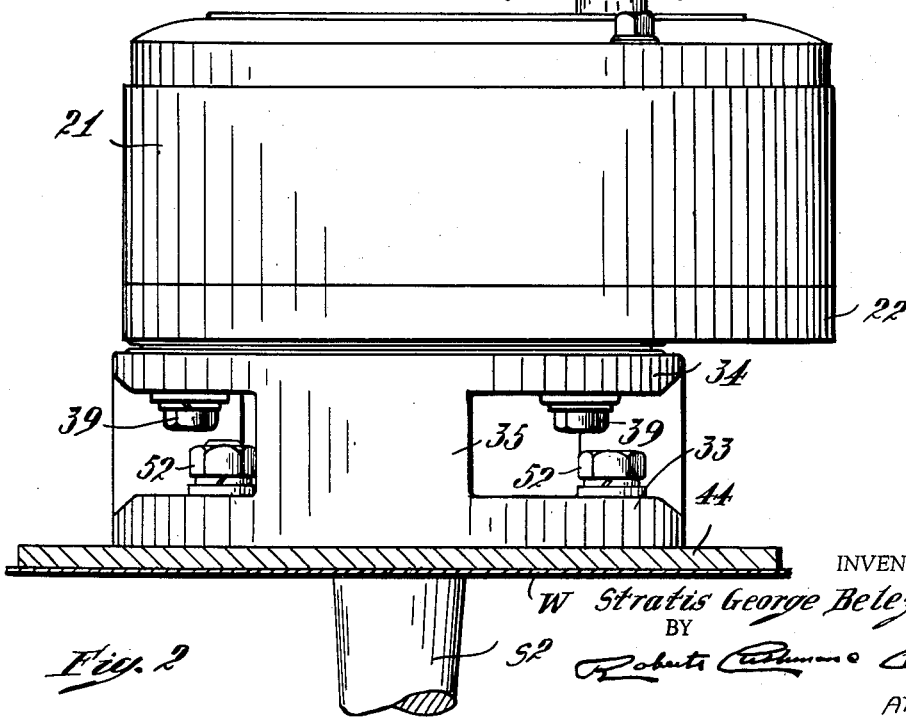
FIG. 2 is a fragmentary plan view, with parts in horizontal section, of the arrangement shown in FIG. 1.
Figure 4:
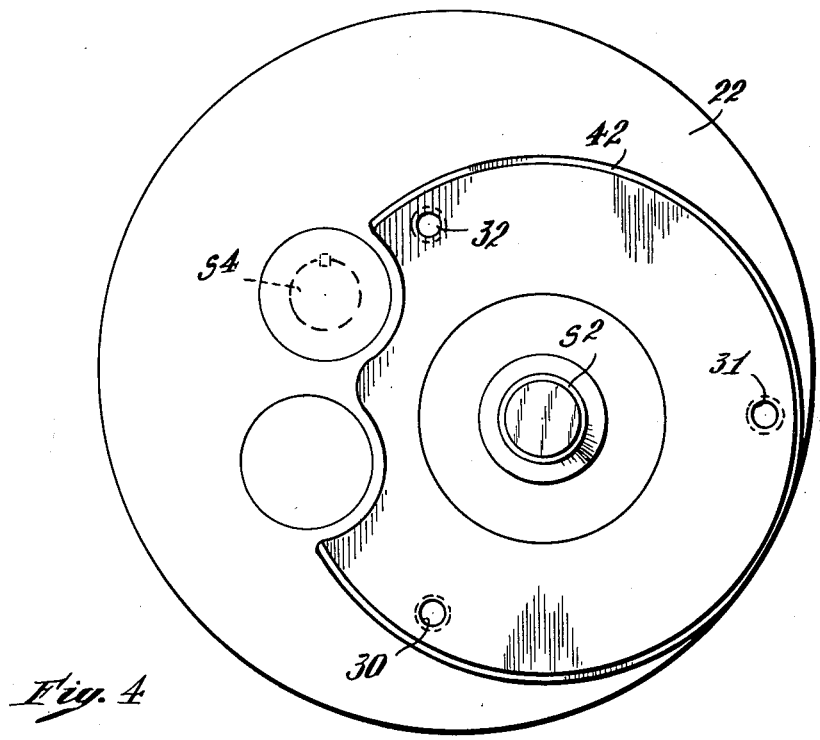
FIG. 4 is an elevation showing that face of the speed-reducer which is adjacent to the adapter when the parts are assembled and showing the output shaft of the speed-reducer and the bolts for connecting it to the adapter in diametrical section.

While the present invention is not limited in its applicability to use with a particular speed-reducer it is herein, for convenience, illustrated as applied to the support of a speed-reducer of the type of that disclosed in the patent to Schumb, No. 2,813,435, dated November 19, 1957, wherein the casing of the speed-reducing unit is circular at all sections transverse to the axes of the parallel input and output shafts. Thus, referring to FIGS. 1 and 2 of the drawings, the casing of the speed-reducer is indicated generally by the character C, this casing comprising the main portion 21 and the cover member 22 (FIGS. 1, 2 and 4) which, as described in the above patent, although not here shown, are held in assembled relation by means of suitable bolts. The end walls of the members 21 and 22 are provided with bearings for the power input shaft $S^4$ and the output shaft $S^2$, as well as for an intermediate shaft (not here shown). These shafts carry intermeshing gears housed within the casing whereby the shaft $S^2$ is driven at a speed less, in accordance with a predetermined ratio, than that of the power input shaft $S^4$.

In accordance with the present invention, the cover 22 of the casing C is provided (FIG. 4) with three screw-threaded holes 30, 31 and 32, equidistant from the axis of the output shaft $S^2$ and spaced equally apart from each other.

Figure 3:
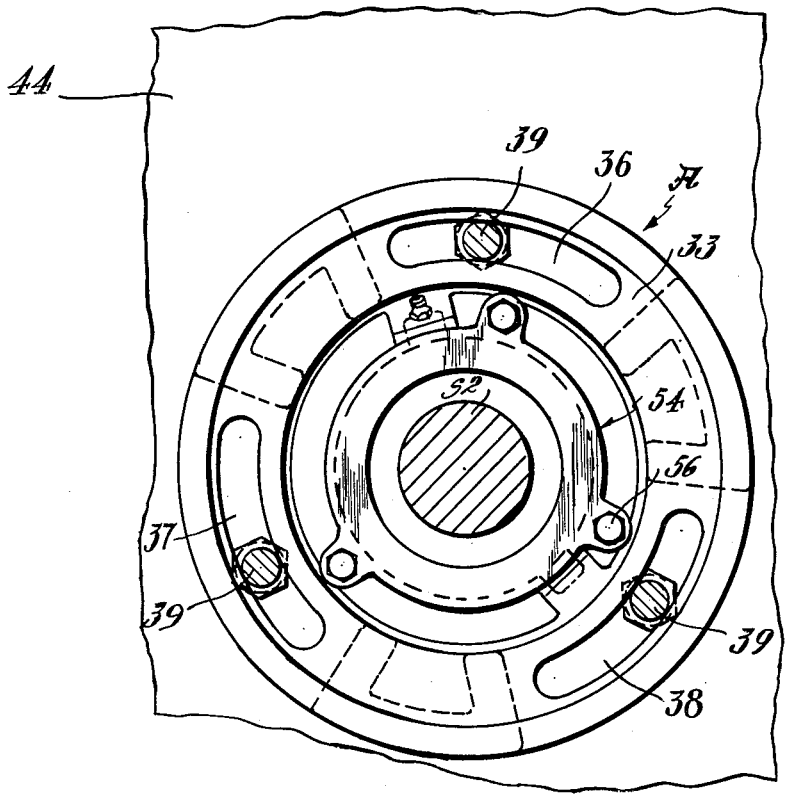
FIG. 3 is a fragmentary elevation partly in vertical section on lines 3—3 of FIG. 1, showing the adapter as mounted on the machine to be driven, but with the speed reducer removed.

The adapter A (FIGS. 1, 2, 3, 5 and 6), in accordance with the present invention, is a rigid casting or forging comprising coaxial, spaced annular members 33 and 34 (FIG. 6) disposed in parallel planes and which are integrally united by one or more rigid arcuate connecting portions 35. The part 34 is provided (FIG. 5) with three arcuate slots 36, 37 and 38 which, when the parts are assembled, are coaxial with the axis of the output shaft and which are designed to receive bolts 39 (FIGS. 1, 2 and 3) having threaded engagement with the screw-threaded openings 30, 31 and 32 (FIG. 4) of the cover 22 of the speed-reducing unit thereby to secure the speed-reducing unit to the adapter with provision for orienting the speed-reducing unit about the axis of the output shaft relatively to the adapter thereby to change the position, in space of the power input shaft $S^4$ of the reducing unit. Such adjustment of the speed-reducing unit may be made by loosening the bolts 39 and then, when the unit has been properly oriented, the bolts are tightened thereby to secure the speed-reducing unit in position relatively to the adapter. Desirably, the annular part 34 (FIG. 6) of the adapter is provided with a concentric annular rib 40, the inner surface 41 of this rib being designed to contact a corresponding annular rib 42 projecting outwardly from the cover 22 of the casing of the speed-reducing unit and which is coaxial with the output shaft of the speed-reducer. The annular member 33 of the adapter is provided with a finished outer surface 43 which is in a plane perpendicular to the axis of the output shaft of the speed-reducer (when the parts are assembled) and which is adapted to contact the outer surface of the casing or frame of the machine with which the device of the present invention is to be employed. As here shown, the machine to be driven is generally indicated by the character M (FIG. 1) and has a frame comprising, for example, the part 44 (FIG. 7) which supports the wall W (FIGS. 2 and 7), said wall being, for example, of sheet metal. When the parts are assembled, as shown in FIG. 7, suitable sealing means S, for example a rubber gasket or the like, is interposed between the outer surface of said wall W and the finished surface 43 (FIG. 6) of the adapter.

The annular member 33 of the adapter is provided, at its outer or rear side, with a coaxial annular rib 45 (FIG. 6) which is designed to enter a circular hole H (FIG. 7) in the wall of the machine, this rib having the peripheral edge 47 (FIGS. 6 and 7) of a size such as to fit snugly within the hole H.

The member 33 of the adapter is provided with holes equally spaced apart, one of which is shown at T (FIGS. 6 and 7), designed to receive bolts 51 (FIG. 1), which pass outwardly through coaxial holes in the wall W of the machine M, and which receive nuts 52 (FIGS. 1 and 2) at their outer or forward ends. By this means, the adapter, as a whole, may be secured leak tight to the wall of the machine M. After the adapter has been permanently secured to the wall of the machine, it is possible to orient the speed-reducer unit relatively to the adapter through a very substantial arc as provided by the length of the slots 36.

Figures 8, 9:
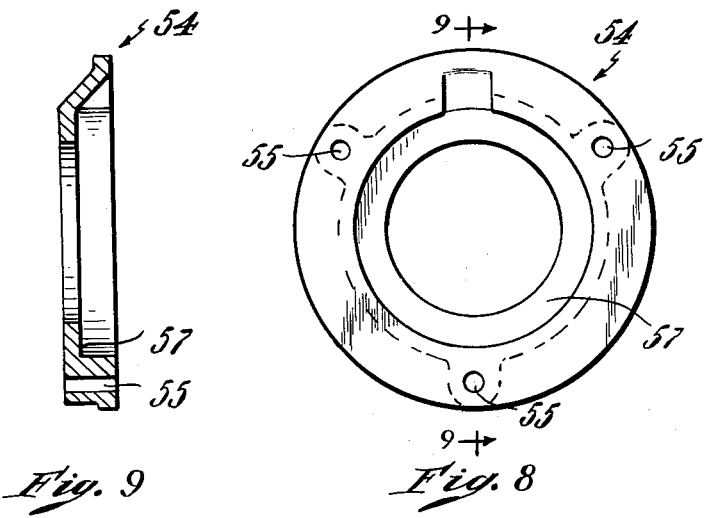
FIG. 8 is an elevation showing a packing gasket forming an element of the adapter.
FIG. 9 is a fragmentary, diametrical section of the gacket of FIG. 8.

The member 33 of the adapter has a peripheral shoulder 53 at its inner side within which there is fitted a packing gland 54 (FIGS. 1, 7 and 9) having, as here shown, three spaced holes 55 designed to receive screws 56 (FIGS. 1, 3 and 7) having engagement with threaded holes in the part 33, whereby the gland 54 may be drawn forcibly toward the part 33. This gland 54 has an annular radial face 57 (FIG. 7) and the member 33 of the adapter has a corresponding annular radial surface 58, these surfaces forming abutments for a plurality of packing gaskets 59 and 60 respectively, having spacer means interposed between them. These gaskets are of resilient material and their central openings are of a normal diameter less than the outside diameter of the output shaft $S^2$. After assembling the packing gaskets between the parts 54 and 33, the screws 56 may be tightened thus compressing the packing gaskets. These annular packing gaskets are of an internal diameter such as to provide leak-tight contact between them and the peripheral surface of the output shaft $S^2$ when the parts are assembled. The packing gland 54 may be provided, if desired, with a conventional grease fitting 63 whereby grease may be forced into the space between the packing gaskets. It will, of course, be understood that the speed-reducer unit C will be provided in customary way (indicated at Z) (FIG. 1), with means to retain grease within the casing of the speed-reducing unit for lubricating the intermeshing gears as is customary.

By the arrangement above described, leakage of fluid from the interior of the machine M along the output shaft $S^2$ is prevented when the machine is in use.

When installing the apparatus, herein described, the adapter will first be secured to the wall of the machine M by means of the bolts 51, with the rib 46 of the adapter fitting within the hole H in the wall of the machine.

Having attached the adapter to the casing of the machine, the assemled speed-reducing unit C is now fitted against the member 34 of the adapter so that the annular rib 42 (FIG. 4) on the cover 22 of the speed-reducing unit fits within the annular rib 40 (FIG. 6) of the adapter. The bolts 39 are now passed through the slots 36, 37 and 38 of the member 34 of the adapter and entered into the screw-threaded openings 30, 31 and 32 (FIG. 4) of the cover member 22 of the reducer unit. Before tightening these bolts, the reducer unit may be oriented about the axis of its output shaft $S^2$ (the latter now projecting through the gaskets 59 and 60 and through the hole H in the wall of the machine casing), until the axis of the input shaft $S^4$ is located in the desired position with respect to the drive belt B, so as to insure the desired degree of tension of the belt. The bolts 39 may now be set up tight and the apparatus is ready for operation. If, during operation, the belt B should become loose or if it should be required that the drive motor be moved to a different position, the bolts 39 may be loosened and the reducer unit C again turned about the axis of the shaft $S^2$ until the belt B is properly tensioned whereupon the bolts will be tightened.

If at any time it be desired to remove the speed-reducer this may be done by removing the bolts 39 and withdrawing the shaft $S^2$ from the gaskets 59 and 60, without in any way disturbing the adapter or necessitating the resealing of the latter with reference to the wall of the washing machine.

While herein reference has been made to a washing machine as the apparatus which is driven by the speed-reducer, it is to be understood that such reference is merely by way of example of utility of the invention and that the adapter may be applied to the frame or casing of any desired apparatus to be driven.

It is further to be understood that the invention is broadly inclusive of any and all devices or apparatus equivalent of that which is herein claimed.

I claim:

1. In combination with a speed-reducer of the kind wherein an output shaft, turning in bearings in a hollow casing, is driven by a power input shaft, parallel to the output shaft, through the intermediary of gearing within the casing and wherein the wall of the casing of said reducer has an aperture through which the output shaft projects, and wherein the apertured wall of the casing of said speed-reducer has an external annular rib concentric with the output shaft, an adapter for supporting said speed-reducer unit at the exterior of a machine to be driven thereby, said adapter comprising a rigid frame comprising a part provided with an opening for the passage of the output shaft, said rigid frame part having an external annular shoulder coaxial with the output shaft when the parts are assembled and so designed as to receive the rib of the speed-reducer casing with a rotary sliding fit, and means for connecting the casing of the reducer unit to said frame part with the rib of the casing fitting within the annular shoulder of the frame member, said means for connecting the speed-reducer unit casing to the adapter comprising a plurality of bolts having screw-threaded engagement with one of said parts and which pass through arcuate slots in the other of said parts, said slots being circumferentially elongate and concentric with the output shaft, the machine to be driven by the speed-reducer including a housing whose wall has an aperture through which the output shaft of the speed-reducer projects into the interior of said housing when the parts are assembled, means, including bolts, operative to secure the adapter leak-tight to the wall of the housing, the adapter comprising means operative to prevent escape of material from the receptacle along the output shaft when the adapter is operably secured to the apertured wall of the receptacle, and the speed-reducer being rotatable about the axis of its output shaft without loosening the bolts which secure the adapter to said housing, the means for preventing escape of material from the receptacle along the output shaft comprising at least one resilient gasket housed within the adapter and which has an aperture for the passage of the shaft, said aperture being of a normal diameter less than the outside diameter of the shaft.

2. In combination with a speed-reducer of the kind wherein an output shaft, turning in bearings in a hollow casing, is driven by a power input shaft, parallel to the output shaft, through the intermediary of gearing within the casing and wherein the wall of the casing of said reducer has an aperture through which the output shaft projects, and wherein the apertured wall of the casing of said speed-reducer has an external annular rib concentric with the output shaft, an adapter for supporting said speed-reducer unit at the exterior of the machine to be driven thereby, said adapter comprising a rigid frame comprising a part provided with an opening for the passage of the output shaft, said rigid frame part having an external annular shoulder coaxial with the output shaft when the parts are assembled and so designed as to receive the rib of the speed-reducer casing with a rotary sliding fit, and means connecting the casing of the speed-reducer unit to said frame part with the rib of the casing fitting within the annular shoulder of the frame member, and including a plurality of bolts having screw-threaded engagement with holes in the apertured wall of the speed-reducer casing and which pass through arcuate slots in the aforesaid part of the adapter frame, said slots being circumferentially elongate and concentric with the output shaft, the machine to be driven by the speed-reducer including a receptacle whose wall has an aperture through which the output shaft of the speed-reducer projects into the interior of said receptacle when the parts are assembled, and the adapter comprising means, operative to prevent escape of material from the receptacle along the output shaft when the adapter is operably secured to the apertured wall of the receptacle, said latter means comprising a plurality of annular, coaxial, resilient gaskets housed within the adapter, the output shaft passing through the central openings of said gaskets, and means operative so to compress said gaskets as to cause the inner edges thereof to form a leak-tight contact with the periphery of the shaft.

3. In combination with a speed-reducer of the kind wherein a rigid casing houses gearing for transmitting motion from an input shaft to an output shaft, the latter extending outwardly through an opening in one wall of the casing, and wherein said wall of the casing has a plurality of screw-threaded holes disposed equidistantly from the axis of the output shaft when the parts are assembled, said wall of the casing of the speed-reducer also having an annular rib, projecting outwardly from its face, which is coaxial with the axis of the output shaft, an adapter operative to support the speed-reducer with its output shaft extending inwardly through an aperture in the wall of a housing within which is located a part to be driven by the output shaft, said adapter having a frame comprising two coaxial, axially spaced annuli, and means rigidly uniting said annuli, one annulus having an external annular rib which, when the parts are assembled, engages the rib which projects from the face of the casing of the speed-reducer with a rotary, sliding fit, said annulus having a plurality of arcuate slots for the reception of bolts having threaded engagement with the holes in the casing of the speed-reducer whereby the speed-reducer may be swung about the axis of the output shaft relatively to the adapter when said bolts are loosened; the other annulus comprised in the adapter having a plane, external surface, perpendicular to the axis of the output shaft, and having a plurality of holes spaced equidistantly from the axis of the output shaft, when the parts are assembled, for the reception of bolts whereby the last-named annulus may be secured, with interposed packing, leak-tight against the apertured wall of the housing for the part to be driven, the heads of said last-named bolts and those which secure the adapter to the casing of the speed-reducer being exposed within the space between the annuli, where they are readily accessible, so that the adapter, together with the speed-reducer, may be removed as a unit from the housing for the part to be driven when desired, while the speed-reducer may be rotated about the axis of its output shaft relatively to the adapter without breaking the seal between the adapter and the housing for the part which is to be driven.

4. The combination with a speed-reducer, having an output shaft, of a part to be driven by said shaft, the speed-reducer having a casing, a housing for the part to be driven, and an adapter interposed between the casing of the speed-reducer and said housing, said adapter comprising a pair of coaxial annuli, and a rigid, arcuate web connecting and holding said annuli in spaced relation, said web being of such circumferential extent as to provide free access to the space between said annuli, means so connecting the casing of the speed-reducer to one of said annuli that the speed-reducer may be rotated about the axis of its output shaft relatively to the adapter, said connecting means comprising a plurality of bolts, and means, comprising a plurality of bolts, operative to secure the other of said annuli leak-tight, to the housing for the part to be driven, the heads of all of the aforesaid bolts being disposed within the space between said annuli and freely accessible for manipulation.

References Cited by the Examiner

UNITED STATES PATENTS

| 2,114,778 | 4/38 | Fillinger. | |
| 2,565,571 | 8/51 | Naumann | 277—187 |
| 2,614,869 | 10/52 | Smith | 277—187 |
| 2,634,686 | 4/53 | Schmitter | 74—325 |
| 2,795,965 | 6/57 | Hinton | 74—325 |

FOREIGN PATENTS 1,247,164  10/60  France.

BROUGHTON G. DURHAM, *Primary Examiner.*

DON A. WAITE, *Examiner.*